Sept. 9, 1924.

O. C. FROKE

AUTOMOBILE CURTAIN

Filed Dec. 4, 1923

1,507,914

INVENTOR:
Ole C. Froke

BY A.M. Carlsen.
ATTORNEY.

Patented Sept. 9, 1924.

1,507,914

UNITED STATES PATENT OFFICE.

OLE C. FROKE, OF SUMMIT, SOUTH DAKOTA.

AUTOMOBILE CURTAIN.

Application filed December 4, 1923. Serial No. 678,397.

*To all whom it may concern:*

Be it known that I, OLE C. FROKE, a citizen of the United States, residing at Summit, in the county of Roberts and State of South Dakota, have invented certain new and useful Improvements in Automobile Curtains, of which the following is a specification.

My invention relates to side curtains for the open type of automobiles commonly known as touring cars and roadsters, and the object is to provide a simple, efficient and inexpensive device permanently attached to a car and which may be manipulated in such a manner as to provide a completely inclosed car body, or one or more openings as desired for ventilation and other purposes as hereinafter set forth.

Figure 1:
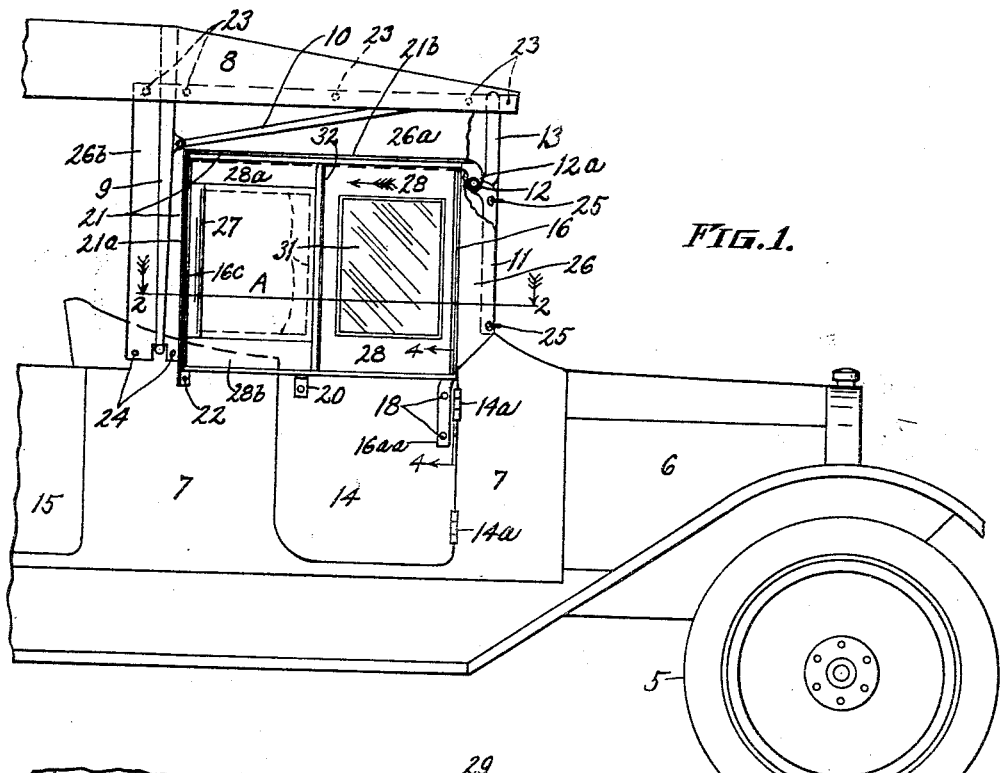
Fig. 1 is a right hand side elevation of the front part of an automobile equipped with one of my devices.

Referring to the drawing by reference numerals, Fig. 1 illustrates a touring car in which 5 represents the front ground wheels, 6 the hood, 7 the body and 8 the top; the latter supported from the body by a brace 9 which may also have an angular forwardly extending brace 10. 11 is the stationary lower windshield frame having at its upper corner the usual joint 12 to which is pivotally secured by bolts $12^a$ the upper windshield frame 13. 14 is the right hand front door to which my device is shown attached although it will be understood that with minor variations the device is equally applicable to all doors of a car.

My improved curtain is mounted in a light rectangular frame mounted on and adjacent the top edge of the door and extending vertically above the door in plane therewith. The front vertical edge $16^a$ is approximately in alignment with the corresponding edge of the door but the lower horizontal edge $16^b$ of the frame extends beyond the door, fitting snugly against the car body and the rear vertical edge $16^c$ of the frame may be about half way between the front and rear doors of the car or near the support 9 (see Fig. 1). All four sides of the frame are preferably made of very light angle iron or channels in which are mounted the curtain and curtain operating means. The lower edge or frame member $16^b$ carries a cleat 17 adapted to rest on the top edge of the car door. The front edge $16^a$ may have a downward extension $16^{aa}$ perforated for bolts 18 passed through the car door and an inside cleat 19 for clamping the front part of the frame to the door. A suitable bracket 20 or other means may also be provided near the opposite end of the car door for securing the frame thereto (see Fig. 1). It will be readily understood that the above described frame swings with the door when the latter is swung on its hinges $14^a$. When the door is closed the upper edge $16^d$ and rear edge $16^c$ of the frame are stopped by and fit within an inverted L-shaped frame 21 preferably made of light angle iron. The vertical arm $21^a$ of said frame has its lower end secured to the car body as at 22 and the forward end of its horizontal arm $21^b$ is perforated for the pivot bolt $12^a$ of the windshield joint.

The common practice of manufacturers of open cars is to provide sectional side curtains adapted to be held in place with turn buttons located on the car top 8 and body 7, about as at 23 and 24, respectively. Hooks 25 are also provided on the windshield frame 11 for holding the front curtain tight against said frame. Such curtains must be secured at all points and the car is inclosed in such a manner that it is difficult or nearly impossible for the driver to make proper signals for turning and if the curtains are loosened at any point there is objectionable flapping of the curtain in the wind currents. My device overcomes these objections. All of the original turn buttons and curtain hooks may be used with my device but only a narrow vertical strip of curtain 26 is required between the vertical front frame member and the windshield frame. This strip may have an integral, horizontal strip $26^a$ extending between the top door frame member $21^b$ and the car top 8 being secured to the former in any suitable manner (not shown) and to the latter on the buttons 23 thereof. $26^b$ is a vertical strip of curtain material with one vertical edge suitably secured to the door frame member $21^a$. The other upright edge of the strip is adjacent the rear car door 15, in a touring car, or secured to the rear curtain (not shown) of a roadster. The top and bottom edges of the strip are secured to the car top and body by the buttons 23 and 24 respectively.

The curtain within the rectangular frame 16 and the means for operating it are as follows:

Adjacent each vertical end of the frame 16 I mount a vertical, rotatable roller 27. 28 is a curtain stretched taut over said rollers approximately one half of the length of said curtain being of a width vertically to cover the frame opening the balance of it comprising two vertically spaced strips 28$^a$—28$^b$ between which is a clear opening. Said strips are provided with straps or chapes 29 at their ends adapted to be engaged in buckles 30 secured in the vertical adjacent edge of the curtain (see Fig. 3). Near the latter edge the curtain is provided with a light 31 of any suitable transparent material, and on said edge is secured a vertically arranged angle iron 32 for a purpose to be described. On the inner vertical edge of the curtain I also provide a vertical angle iron 33 for adjusting the curtain.

Figure 2:
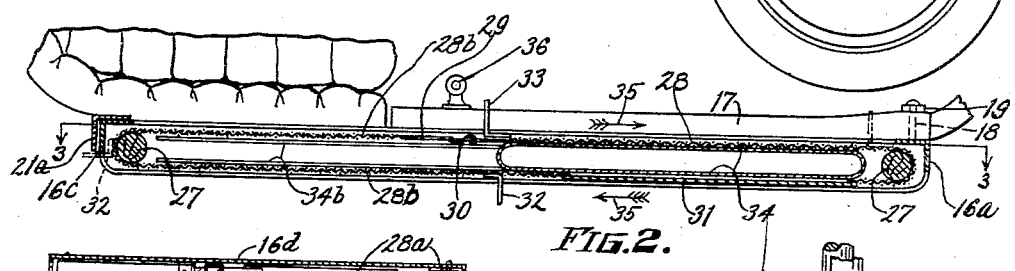
Fig. 2 is an enlarged section on the line 2—2 in Fig. 1.
Figure 3:
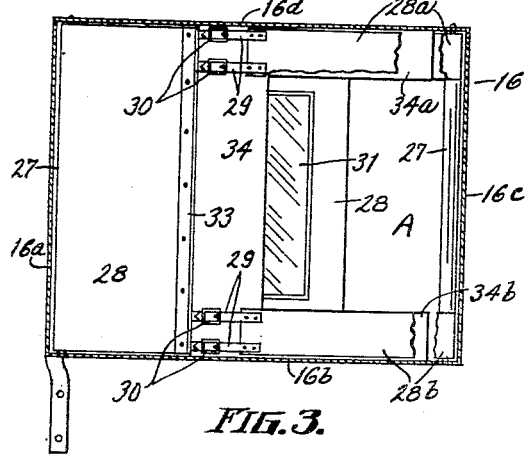
Fig. 3 is a sectional elevation of my device as on line 3—3 in Fig. 2, in reduced scale.
Figure 4:
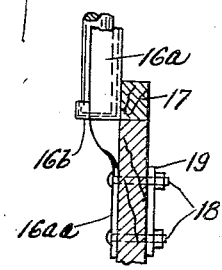
Fig. 4 is an enlarged section on line 4—4 in Fig. 1 showing mainly the means for attaching my device to an automobile door.

34 is a double walled, light partition mounted vertically in the frame (see Figs. 2 and 3). Said partition is about half the width of frame 16 and may have upper and lower extensions 34$^a$—34$^b$ respectively, of the same width as the curtain strips and adapted to be covered by the latter. Said partition and extensions serve as guides for the curtain and prevent the latter from flapping in a high wind.

In the use of my device, assuming that the curtain is in open position as in Fig. 1, that is, one half of the curtain is on each side of the partition 34, there is an opening A between the upper and lower curtain strips, admitting considerable light and ventilation. This opening is large enough for the driver or any occupant of the car to stick his head through or to stick his arm out for signalling. When desiring to close the curtain the driver merely takes hold of the inwardly extending part of the angle iron 33 and pushes forward, causing the curtain (which acts as a belt) to move in the direction of arrows 35 (Fig. 2) until the outer angle iron 32 stops against the frame end 16$^c$ as shown dotted in Fig. 1. The light 31 will then occupy the position indicated in dotted lines in Fig. 2, said light and the curtain part about it completely closing the aperture A and leaving no working parts exposed to the elements.

36 is the regular door knob for releasing the car door from its closed position. When the door is swung open the curtain and its frame will of course swing with it but the stationary frame 21 and surrounding curtains remain in their respective positions.

It is readily understood that if my device is used on all car doors minor changes must be made, as for instance, if the device is used on the rear door 15 the front end of the stationary frame bar 21 would necessarily have to be secured to the support 9 or perhaps be rigidly supported from the car body, but such variations readily come within the intended spirit and scope of my invention.

What I claim is:

1. In a vehicle curtain of the class described, a quadrangular frame detachably secured on the top part of a vehicle door, and extending upwardly in a common plane with the door, a rigid, rectangular frame secured to the vehicle and adapted to receive the first frame when the vehicle door is closed, said quadrangular frame having an aperture, vertically arranged rollers one in each end of said frame, a movable belt-like curtain engaging said rollers, said curtain having an aperture adapted to register with the aperture in the frame when the curtain is in one position, a quadrangular light in the curtain adapted to cover the aperture in the frame when the curtain is moved to another position to admit light into the vehicle, means for keeping the curtain taut and means within the quadrangular frame for guiding and preventing flapping of the curtain.

2. The structure specified in claim 1, said movable curtain comprising a large plain section and two vertically spaced narrow extensions the space between the latter forming the aperture in the curtain.

3. The structure specified in claim 1, in which said curtain guiding means comprises a vertically arranged partition within the quadrangular frame and between the two runs of the curtain, said aperture in the frame being located between one end of said partition and the adjacent curtain roller.

4. The structure specified in claim 1, in which said curtain guiding means comprises a vertically arranged partition within the quadrangular frame and between the two runs of the curtain, said aperture in the frame being located between one end of said partition and the adjacent curtain roller, and two vertically spaced narrow partitions constituting extensions of the first mentioned partition and adapted to guide the narrow curtain extensions, for the purpose described.

In testimony whereof I affix my signature.

OLE C. FROKE.